United States Patent [19]

Bonvallet et al.

[11] Patent Number: 5,222,129
[45] Date of Patent: Jun. 22, 1993

[54] TELEPHONE CHARGING SIGNALLING DETECTOR SUITABLE FOR CENTRAL OFFICE LINE INTERFACE CIRCUITS

[75] Inventors: André Bonvallet, Asnieres; Robert Girard, Colombes; Michel Canonne, Margency, all of France

[73] Assignee: Alcatel Business Systems, Paris, France

[21] Appl. No.: 540,435

[22] Filed: Jun. 19, 1990

[30] Foreign Application Priority Data

Jun. 19, 1989 [FR] France .................... 89 08118

[51] Int. Cl.$^5$ .............................. H04M 1/74
[52] U.S. Cl. ................... 379/387; 379/399; 379/236; 379/235; 379/231
[58] Field of Search ............. 379/387, 398, 399, 231, 379/232, 233, 236, 237, 359, 362

[56] References Cited

U.S. PATENT DOCUMENTS

| | | | |
|---|---|---|---|
| 3,393,274 | 7/1968 | Ingraham | 379/236 |
| 3,506,789 | 4/1970 | Brockschmidt et al. | 379/236 |
| 4,001,515 | 1/1977 | Zorzy | 379/231 |
| 4,053,709 | 10/1977 | Vélu et al. | 379/235 |
| 4,270,027 | 5/1981 | Agrawal et al. | 379/397 |
| 4,479,188 | 10/1984 | de Keijzer | 379/235 |
| 4,563,547 | 1/1986 | Booth | 379/236 |
| 4,856,059 | 8/1989 | Halbig | 379/399 |
| 4,914,690 | 4/1990 | Hagedorn | 379/233 |
| 4,930,153 | 5/1990 | Hagedorn | 379/233 |

FOREIGN PATENT DOCUMENTS

| | | |
|---|---|---|
| 0279025 | 8/1988 | European Pat. Off. . |
| 2551604 | 3/1985 | France . |
| 2005111 | 4/1979 | United Kingdom . |

Primary Examiner—James L. Dwyer
Assistant Examiner—Magdy W. Shehata
Attorney, Agent, or Firm—Sughrue, Mion, Zinn, Macpeak & Seas

[57] ABSTRACT

Detector for telephone charging signalling in the form of periodic pulses derived from alternating current signals at specific frequencies transmitted in analog form by means of a line (2) comprising two wires (A, B), for example to a central office line interface circuit of a private telephone installation connected to an analog network subscriber line. The detector comprises an input filter (4) centered on the frequency (Ft) of the expected signalling, a sample and hold circuit (6) connected to the output of the input filter (4) and to the output of a clock (7) supplying a signal (HE) whose frequency (FE) is close to the value (Ft), a lowpass filter (8) within the band of which the characteristic signal from the sample and hold circuit is included, and a level detector (9) adapted to supply a presence signal for a characteristic signal at a level above a predetermined threshold at the output of the lowpass filter (8).

7 Claims, 2 Drawing Sheets

5,222,129

TELEPHONE CHARGING SIGNALLING DETECTOR SUITABLE FOR CENTRAL OFFICE LINE INTERFACE CIRCUITS

FIELD OF THE INVENTION

The invention concerns a detector for telephone charging signalling transmitted in the form of periodic pulses derived from alternating current signals at specific frequencies and is more particularly concerned with detectors for central office line interface circuits (hereinafter COLICs) for connecting private telephone installations to analog telephone network lines.

COLICs connect the switch or the key service unit of a private telephone installation to a local central office, which is usually part of a telephone network, to enable telephones or terminals connected to the private installation to communicate with telephones or terminals connected to the network but not connected to the installation.

BACKGROUND OF THE INVENTION

At present many network subscriber lines are still of the analog type and transmit speech signals in analog form on two wires in an audible frequency band between 300 and 3,400 Hz. The two line wires are also used to transmit signals, for example by modification of the impedance or in the form of a voltage or current or pulses at specific frequencies, for example telephone charging pulses of the conventional kind.

Modern private telephone switches are increasingly using time-division switching which entails encoding the speech signals in digital form and which is well suited to the transmission of speech and data signals on the same media according to the changing requirements of the user. It is therefore necessary to convert charging pulses supplied in analog form into digital data, usually as soon as they are received by the private installation, at the COLICs which transmit them.

SUMMARY OF THE INVENTION

The invention therefore proposes a detector for telephone charging signalling in the form of periodic pulses derived from alternating current signals at specific frequencies transmitted in analog form by means of a line comprising two wires, for example to a central office line interface circuit of a private telephone installation connected to an analog network line, where the detector must be reliable, economical and compact.

According to one characteristic of the invention, the signalling detector comprises an input filter of moderate selectivity centered on the frequency of the expected signalling transmitted differentially on the line wires to which the filter is connected, optionally through a protection device, a sample and hold circuit connected to the output of the input filter and to the output of a clock supplying a signal whose frequency is close to the expected value so as to supply a characteristic sampled output signal representing the difference between the expected signal frequency and the sampling frequency when signalling is received, a lowpass filter within the band of which the characteristic signal is included, and a level detector adapted to supply a binary digital signal according to whether there is present or not a signal characteristic of signalling received at a level above a predetermined threshold at the output of the lowpass filter.

BRIEF DESCRIPTION OF THE DRAWINGS

The invention, its characteristics and its advantages are specified in the following description with reference to the figures listed below.

DETAILED DESCRIPTION OF THE PREFERRED EMBODIMENTS

Figure 1:
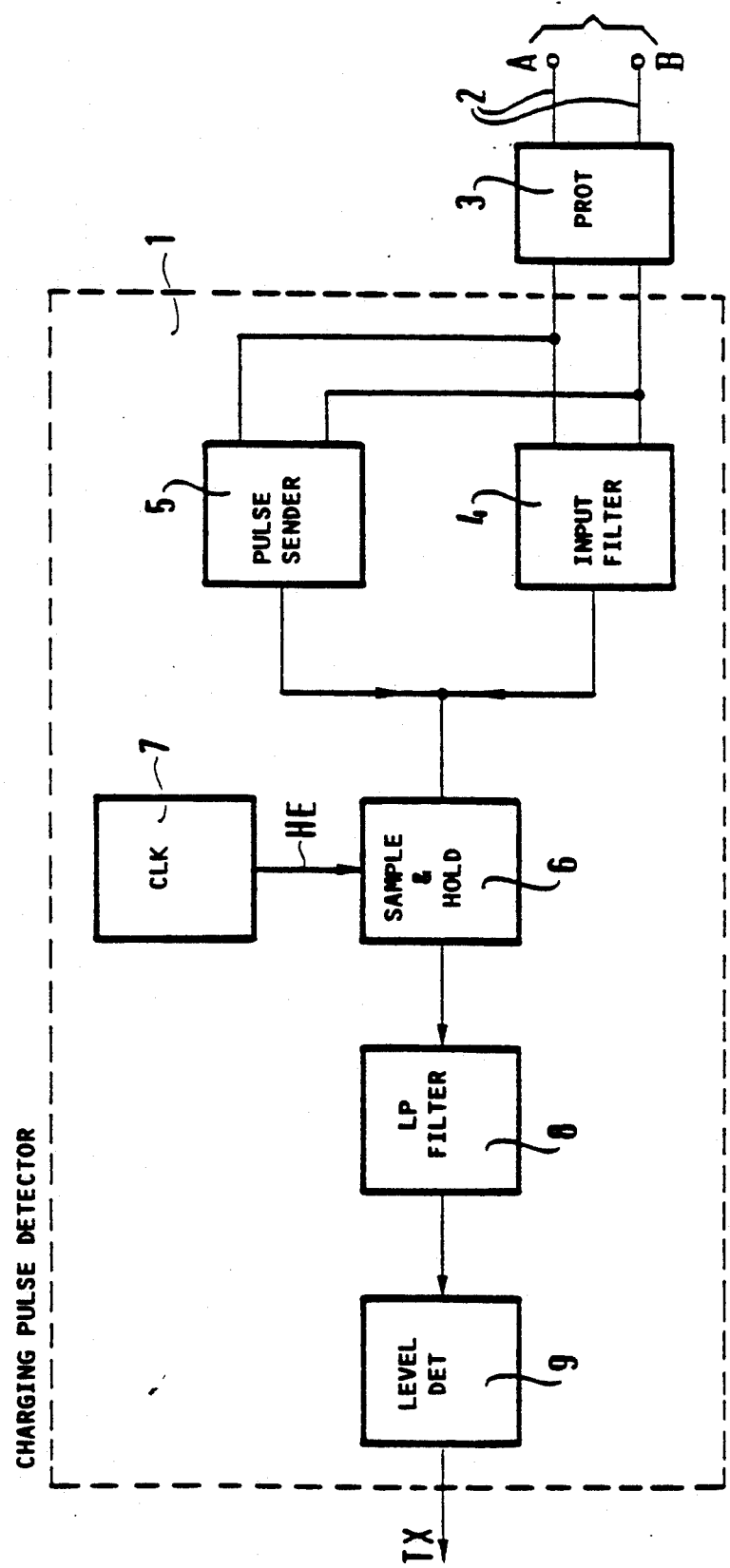
FIG. 1 is a block schematic of a charging pulse detector in accordance with the invention.

The charging pulse detector 1 schematically represented in FIG. 1 is designed to capture charging pulses transmitted on a telephone line 2 from the local central office at which the line 2 terminates. To this end it is connected to the two wires A, B of said line via a conventional protection device 3. The latter provides protection against overvoltages, for example by means of a surge arrestor diode shunting the wires of the line 2, and protection against radio frequency interference by means of capacitors and simple inductive circuits, in an arrangement that is conventional in this art and that is not shown here as it has no direct relationship with the invention.

The charging pulse detector 1 includes an input filter 4 of moderate selectivity centered on the frequency Ft of the "very low frequency" charging signal conventionally transmitted in differential mode by the local central office via the two wires A, B of the line 2. As a general rule, it also comprises a charging pulse sender 5 for sending charging pulses alternately supplied at extremely low frequency and in common mode on the same line wires by the local central office. Conventionally the pulse signals transmitted in differential mode have a frequency Ft equal to 12 or 16 kHz while those transmitted in common mode have a frequency of 50 Hz.

The pulse sender 5 comprises, for example, two equal-value resistors each connected to a respective one of the wires A, B of the telephone line 2 via two equal-value capacitors 40 and 41 and connected together at a common point connected to an input of a sample and hold circuit 6. The output of the input filter 4 is also connected to the input of the sample and hold circuit 6 which receives a clock signal HE from a clock 7 which in this instance is internal to the charging pulse detector 1.

The frequency of the clock signal HE used to sample the signals supplied by the filter 4 or by the pulse sender 5 has a value $FE = Ft + V + \epsilon$, V being equal to the permissible variation on the frequency Ft and $\epsilon$ the value of the image frequency of $Ft + V$. Thus in an embodiment in which the signal frequency Ft is 12 kHz the value selected for the frequency FE is, for example, 12,170 Hz, the value of $\epsilon$ being 70 Hz, a value sufficiently high to be detected in a relatively short time.

The sample and hold circuit therefore provides an output signal at the image frequency $V + \epsilon$, in this example 170 Hz, from which the incident frequency Ft is virtually eliminated.

The 50 Hz frequency signal alternately supplied by the pulse sender 5 is hardly attenuated at all by sampling it at the frequency FE and is therefore present at the output of the sample and hold circuit 6.

A lowpass filter 8 is connected to the sample and hold circuit 6. Its bandwidth is equal to $2 V + \epsilon$ to transmit the signals at the image frequency $V + \epsilon$ and those at 50

Hz; this filter does not need to be highly selective in that the differences between the frequency to be detected and the frequencies to be eliminated are much more meaningful at the same level for the low frequencies at the output of the sample and hold circuit 6 than for the medium frequencies present on the wires of the telephone line 2 and at the output of the input filter 4.

A simple level detector 9 connected to the output of the lowpass filter 8 is sufficient to determine whether or not there is present a signal lying in the passband of the filter and therefore assumed to correspond to a signal characteristic of charging that the detector 9 converts into a binary logic signal TX for the benefit of the control unit.

Figure 2:
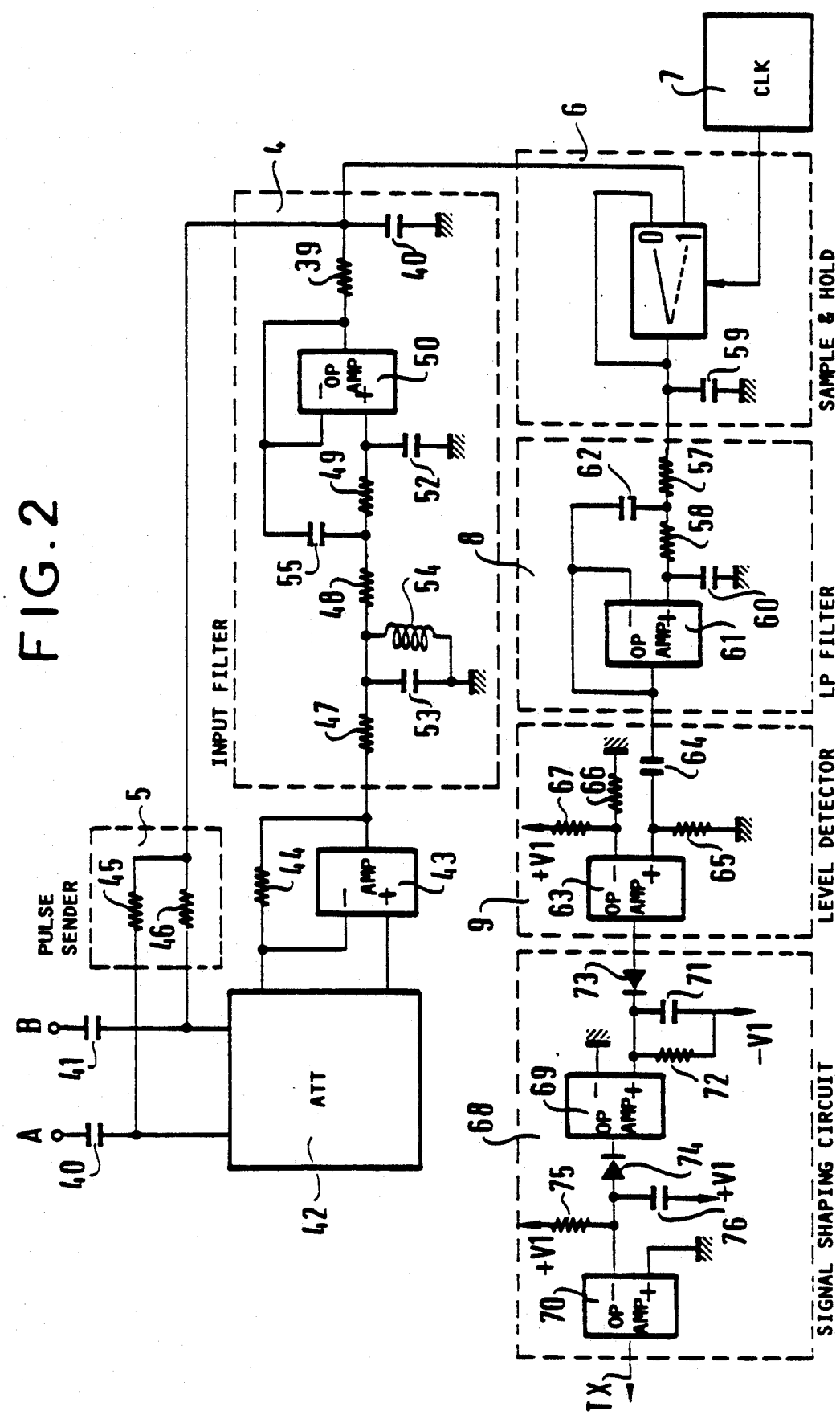
FIG. 2 shows one embodiment of the charging pulse detector schematically represented in FIG. 1.

The charging pulse detector 1 shown in FIG. 2 is assumed to be connected to the wires A, B of a telephone line 2 on the output side of the protection device 3 of a COLIC that incorporates it, as explained previously, the remainder of which is not shown.

The detector 1 is connected by two capacitors 40 and 41 for blocking DC components to the two wires which extend the wires of the line 2 into the COLIC. An attenuator circuit 42 which is not described here because it is conventional and does not characterize the invention is connected to the wires A, B via the capacitors 40 and 41. It drives the input filter 4 via an amplifier 43 whose two inputs are driven by the wires A, B and whose output is conventionally looped to its inverting input via a resistor 44.

The pulse sender 5 comprises two resistors 45 and 46 which are connected together at one end and connected at the other end via respective capacitors 40, 41 to the wires A, B.

The input filter 4 centered on the frequency Ft is in this example formed by three resistors 47, 48 and 49 in series connected to the non-inverting input of an operational amplifier 50, which input is also grounded by a capacitor 52. The common point of the resistors 47 and 48 is grounded through a circuit comprising a capacitor 53 and an inductor 54 in parallel. The output of the amplifier 50 is fed back to its inverting input and is also connected to the common point of the resistors 48 and 49 by a capacitor 55. A resistor 39 connected to the output of the amplifier 50 is connected to the common point of the resistors 45, 46 of the pulse sender 5 so that the input for the signal to be processed of the sample and hold circuit 6, which is connected to this common point, can be alternately driven either by pulses transmitted in differential mode by the filter 4 or by pulses transmitted in common mode by the sender 5.

The sample and hold circuit 6 receives a sampling signal supplied to it by the clock 7, the frequency of this signal being, for example, 12,170 Hz as explained above when the frequencies of the charging pulses likely to be received are either 12 kHz or 50 Hz.

The sampled signal is conventionally held in a capacitor 59 and is applied to an input resistor 57 of the lowpass filter 8. As already explained, the bandwidth of this filter 8 is in the order of 2 V+ε. The filter essentially comprises the resistor 57 in series with a resistor 58 between the capacitor 59 and a capacitor 60, both these capacitors being grounded, this circuit driving the non-inverting input of an operational amplifier 61.

The output of the operational amplifier 61 is conventionally looped to its inverting input and is also connected to the common point of the resistors 57 and 58 through a capacitor 62. It drives the level detector 9. The latter is based on an operational amplifier 63 receiving the output signal from the amplifier 61 on its non-inverting input through a circuit comprising a capacitor 64 and a high-value resistor 65 conventionally connected between the non-inverting input and ground, while the inverting input is connected to the common point of a resistor divider 66, 67 connected between ground and the supply voltage +V1.

The output signal of the amplifier 63 is applied to a shaping circuit 68 which sends binary charging pulses on a transmission link TX to the signalling circuit servicing the COLIC. The signal shaping circuit comprises, for example, two operational amplifiers 69, 70 in series. The first has its inverting input grounded and its non-inverting input connected to a negative voltage −V1 by a circuit comprising a capacitor 71 and a resistor 72 in parallel. This non-inverting input is also connected to the output of the amplifier 63 by a forward-biased diode 73. A reverse-biased diode 74 connects the output of the amplifier 69 to the inverting input of the amplifier 70 which is connected by a capacitor 76 and a resistor 75 to the voltage +V1. The inverting input of the amplifier 70 is grounded.

We claim:

1. A detector for telephone charging signalling in the form of periodic pulses derived from alternating current signals at specific frequencies transmitted in analog form by means of a line (2) comprising two wires (A, B), for example to a central office line interface circuit of a private telephone installation connected to an analog network line through a protection circuit (3), characterized in that said detector comprises an input filter (4) centered on the frequency (Ft) of the expected telephone charging signalling transmitted differentially on the line wires to which the filter is connected, a sample and hold circuit (6) connected to the output of the input filter (4) and to the output of a clock (7) supplying a signal (HE) whose frequency (FE) is close to the valve (Ft) so as to supply a characteristic sampled output signal representing the difference between (FE) and (Ft) when signalling is received, a lowpass filter (8) within the band of which the characteristic signal is included and which receives as an input an output of said sample and hold circuit (6), and a level detector (9) adapted to supply a binary digital signal according to whether there is present or not a signal characteristic of signalling received at a level above a predetermined threshold at the output of the lowpass filter (8).

2. Signalling detector according to claim 1 characterized in that it further comprises a pulse sender (5) for signalling transmitted in common mode on the line wires, said sender having inputs connected to the wires of the line (2) and an output connected to the sample and hold circuit in parallel with the input filter (4).

3. Signalling detector according to claim 2 characterized in that the pulse sender (5) for pulses received in common mode comprises two equal-value resistors (45, 46) connected to each other at one end and each connected to one of the wires (A, B) via two capacitors (40, 41).

4. Signalling detector according to claim 1 characterized in that it comprises an input filter (4) including an operational amplifier (50) the non-inverting input of which is grounded by a capacitor (52) and is connected to three resistors (47, 48, and 49) in series, the common point of the first two resistors (47 and 48) being grounded by a circuit comprising a capacitor (53) and an inductor (54) in parallel, the output of the amplifier (50) being connected to its inverting input and to the common point of the last two resistors (48 and 49) via a capacitor (55).

5. Signalling detector according to claims 1, 2 or 3 characterized in that it comprises a resistor (39) connected to the output of the amplifier (50) of the input filter and to the common point of the resistors (45, 46) of the pulse sender (5) in such a way that the signal to process input of the sample and hold circuit (6), which is connected to this common point, can be alternately driven either by pulses transmitted in differential mode by the filter (4) or by pulses transmitted in common mode by the pulse sender (5).

6. Signalling detector according to claim 5 characterized in that the lowpass filter (8) includes a circuit comprising a resistor (57) in series with a resistor (58) between two capacitors (59 and 60) each of which is grounded, this circuit driving the non-inverting input of an operational amplifier (61) whose output is looped to its inverting input and to the common point of the resistors (57 and 58) by a capacitor (62).

7. A signalling detector according to claim 1, wherein said input filter (4) is connected to said line wires through said protection device.

* * * * *